United States Patent
Peltonen et al.

(10) Patent No.: US 7,614,326 B2
(45) Date of Patent: Nov. 10, 2009

(54) METHOD FOR INDEXING A ROTATING TOOL AND A TOOL FOR MACHINING

(75) Inventors: Kalle Peltonen, Tampere (FI); Markus Reinikka, Tampere (FI)

(73) Assignee: Mandrel Oy, Tampere (FI)

( * ) Notice: Subject to any disclaimer, the term of this patent is extended or adjusted under 35 U.S.C. 154(b) by 110 days.

(21) Appl. No.: 11/018,860

(22) Filed: Dec. 20, 2004

(65) Prior Publication Data

US 2005/0166727 A1 Aug. 4, 2005

Related U.S. Application Data

(63) Continuation of application No. PCT/FI03/00518, filed on Jun. 26, 2003.

(30) Foreign Application Priority Data

Jun. 28, 2002 (FI) .................. 20021289

(51) Int. Cl.
B23B 29/34 (2006.01)

(52) U.S. Cl. .............. 82/1.11; 82/1.5; 408/59; 408/147

(58) Field of Classification Search ............ 82/1.11, 82/1.2, 1.4, 1.5; 408/59, 57, 147, 158, 180, 408/186
See application file for complete search history.

(56) References Cited

U.S. PATENT DOCUMENTS

| 2,215,344 | A | * | 9/1940 | Albrecht | 408/152 |
|---|---|---|---|---|---|
| 2,269,320 | A | * | 1/1942 | Rosborough | 408/180 |
| 2,458,753 | A | * | 1/1949 | Wallace | 408/180 |
| 3,313,187 | A | * | 4/1967 | Benjamin et al. | 408/153 |
| 3,538,795 | A | * | 11/1970 | Fout | 408/180 |
| 3,542,528 | A | * | 11/1970 | Jorgen | 407/37 |
| 3,893,373 | A | | 7/1975 | Bernd et al. | 91/35 |
| 3,968,415 | A | | 7/1976 | Hafla et al. | 318/569 |
| 4,195,957 | A | * | 4/1980 | Wittkopp et al. | 408/148 |
| 4,224,846 | A | * | 9/1980 | Eysel et al. | 82/158 |
| 4,697,484 | A | | 10/1987 | Klee et al. | |
| 4,852,428 | A | | 8/1989 | Haga et al. | 74/826 |
| 5,136,896 | A | | 8/1992 | Burka | 74/813 |
| 5,205,806 | A | | 4/1993 | Ishida et al. | 483/18 |
| 5,927,911 | A | | 7/1999 | Steiner | |
| 6,033,160 | A | | 3/2000 | Heule et al. | |
| 6,270,295 | B1 | * | 8/2001 | Hyatt et al. | 408/1 R |
| 6,536,998 | B2 | * | 3/2003 | Hyatt et al. | 408/147 |
| 6,655,883 | B2 | * | 12/2003 | Maar | 408/158 |
| 6,705,184 | B2 | * | 3/2004 | Cardemon et al. | 82/1.11 |
| 7,272,877 | B2 | * | 9/2007 | Cardemon et al. | 29/26 A |

FOREIGN PATENT DOCUMENTS

DE 314983 6/1982
EP 0214090 3/1987

(Continued)

*Primary Examiner*—Boyer D Ashley
*Assistant Examiner*—Sara Addisu
(74) *Attorney, Agent, or Firm*—Hoffmann & Baron, LLP

(57) ABSTRACT

A method of indexing a rotating cutting tool, and a tool for machining. The tool includes a body, and one or more cutting parts, that can be moved relative to the body at least into a first position and a second position. The cutting part is locked into the indexed positions by a pressure medium operated actuator.

18 Claims, 4 Drawing Sheets

FOREIGN PATENT DOCUMENTS

| | | |
|---|---|---|
| EP | 0500104 | 8/1992 |
| GB | 2053748 A | 2/1981 |
| JP | 61-90808 | 5/1986 |
| JP | 1-097505 | 4/1989 |
| JP | 11-138310 | 5/1999 |
| JP | 2002137132 A * | 5/2002 |

* cited by examiner

METHOD FOR INDEXING A ROTATING
TOOL AND A TOOL FOR MACHINING

This application is a Continuation of International Application PCT/FI2003/000518, filed Jun. 26, 2003, which designated the U.S. and was published under PCT Article 21 (2) in English, and claimed priority to Finnish Application No. 20021289, filed Jun. 28, 2002.

FIELD OF THE INVENTION

The invention relates to a method of indexing a rotating tool used in machining, and further to a tool for machining. The tool is rotated around its axis in a spindle of a machine tool, and at least one cutting part comprised by the tool is indexed relative to a body of the tool in such a manner that the cutting part has at least a first position and a second position.

BACKGROUND OF THE INVENTION

Different machine tools are used in machining, such as milling machines, horizontal boring and milling machines and drilling machines. Lathes may also comprise rotating tools. Machine tools comprise a spindle, in which a tool can be arranged, which can be made to rotate around its axis by rotating the spindle. The tool comprises a body having fastening means for fastening the tool to the spindle. The tool further comprises at least one cutting part having a cutting edge for detaching material from an object being machined. The cutting part typically comprises an insert, which can be replaced when required. The cutting part may comprise an insert holder for fastening the insert. Conventionally, the cutting part is preset by moving the insert holder relative to the body of the tool into an accurately predetermined position, after which it is locked immobile. The insert holder usually comprises a mechanical locking, usually a screw locking, for holding the cutting part in the set position. Consequently, such a tool has only one fixed measure that can no longer be changed in the machine tool. For example, a special boring tool has to exist for each hole to be bored and having a different diameter. The problem herein is that the number of tools becomes large. However, there is not always sufficient space in the tool magazines of machine tools for all different tools, not to mention reserve tools. This presents a significant drawback particularly in automatic machine tools intended for unmanned drive. Furthermore, much time is taken by change of tools when machining with a tool having a special form, since a special tool, set to one measure, has to be retrieved for each measure machined, which naturally impairs the performance of machining.

As a solution to the above problem, a tool for machining has been developed, wherein the cutting part can be moved relative to the body of the tool by means of an electric actuator. However, one of the drawbacks is that the electric conductor has to be led to the rotating tool through the spindle. In addition, the machine tool has to comprise a special separate control apparatus for controlling the actuator. Consequently, an electrically controlled tool is subject to significant changes in conventional machine tools. Furthermore, an electrically controlled tool is susceptible to malfunction under demanding machine shop circumstances. A further drawback of an electrically adjustable tool is its high price.

SUMMARY OF THE INVENTION

The object of the present invention is to provide a new and improved method and tool for machining.

The method of the invention is characterized by locking the indexed cutting part immobile relative to the body of the tool by means of a pressure medium operated actuator comprised by the tool.

The tool of the invention is characterized in that the tool comprises at least one pressure medium operated actuator for locking the cutting part into said indexed positions, and at least one conduit for leading pressure medium to said actuator.

The essential idea of the invention is that the tool has one or more cutting parts, at least one of which can be indexed into at least two positions. The indexed cutting part is locked immobile during machining by using the pressure medium operated actuator in the tool. The pressure medium, such as for instance cutting fluid, can be led to the actuator from the spindle of the machine tool along conduits comprised by the tool.

An advantage of the invention is that the cutting part of the tool can be indexed and locked into predetermined positions with normal functions of the machine tools and without electric or the like external means. Accordingly, the tool according to the invention can be arranged in a conventional machine tool without any special accessories or essential variations. In addition, a pressure medium operated actuator endures well blows and vibration. Furthermore, such an actuator can be used to relatively easily create sufficiently strong fastening forces, rendering the tool solid and dimensionally accurate.

The essential idea of an embodiment of the invention is that the actuator is pressure fluid operated. As pressure fluid, cutting fluid is used, which can be led from conduits in the spindle to the tool and further to the actuator. The components existing in a machine tool and associated with the feed and control of cutting fluid can thus be utilized for locking the cutting part.

The essential idea of an embodiment of the invention is that the movement of the spindle of the machine tool is utilized in indexing the cutting part. The tool may comprise means based on centrifugal force or moment of inertia, which, by the action of the rotating movement of the spindle, generate a force that can be used for indexing the cutting part.

The essential idea of an embodiment of the invention is that the tool comprises a pressure medium operated device for indexing the cutting part. Said device can be operated with flushing medium.

BRIEF DESCRIPTION OF THE DRAWINGS

The invention is described in detail in the attached drawings, in which.

For the sake of clarity, the figures show the invention in a simplified manner. Like parts are denoted by like references.

DETAILED DESCRIPTION OF THE PREFERRED EMBODIMENTS

Figure 1:
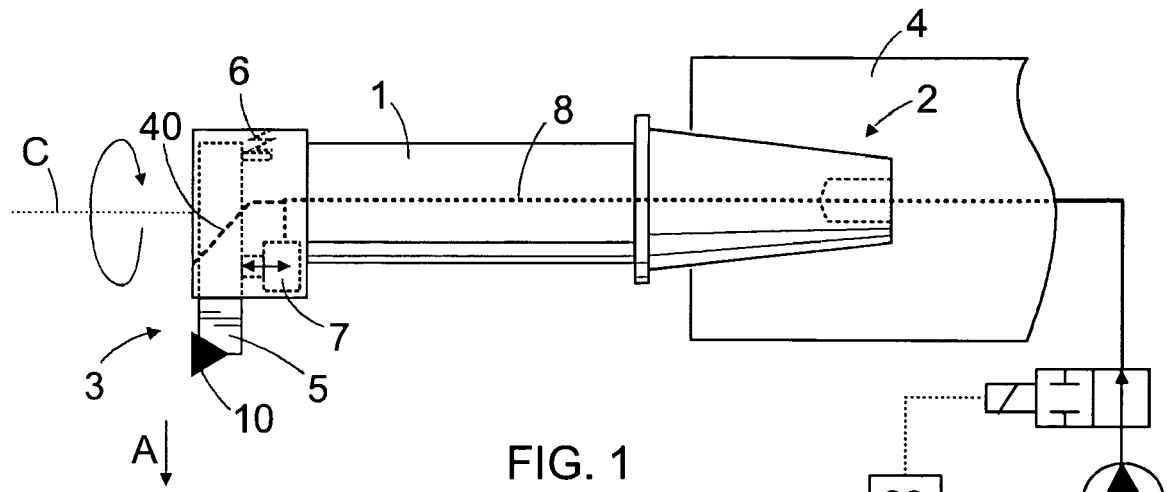
FIG. 1 is a schematic side view of a boring tool according to the invention, with the cutting part in a first position.
Figure 2:
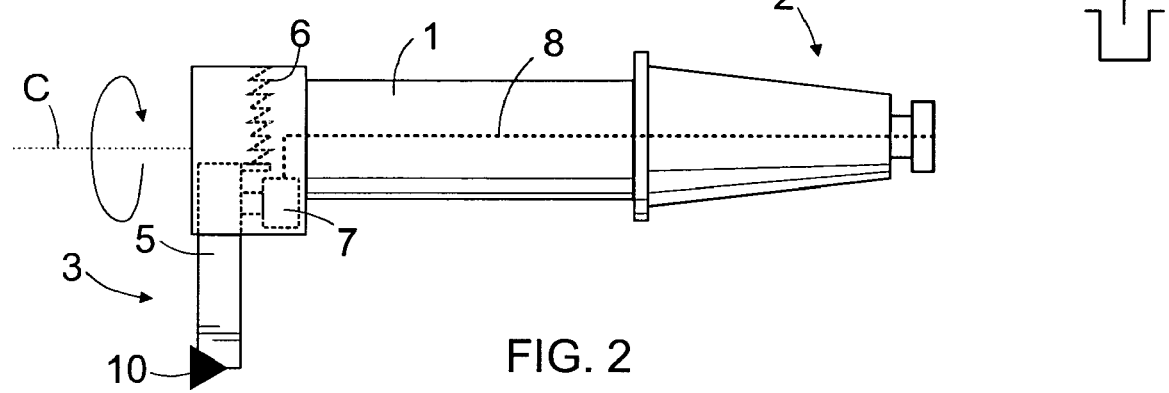
FIG. 2 is a schematic side view of the boring tool of FIG. 1 with the cutting part in a second position, FIG. 3 schematically shows the principle of an alternative locking construction, FIG. 4 schematically shows the principle of still another alternative locking construction.

FIG. 1 shows a boring tool comprising a body 1, a fastening part 2 at one end of the body 1, and a cutting part 3 at the other end of the body 1. There may be one or several cutting parts 3. The fastening part 2 may comprise a taper or other suitable means for fastening the tool to a spindle 4 in a machine tool. Furthermore, the fastening part 2 may be a separate piece detachable from and attachable to the body 1. FIG. 2 shows the principle of an alternative fastening part 2. On the other hand, the fastening part 2 may refer to a contact surface in the body 1 of the tool, to which one or more pieces can be fastened for fastening the tool to the spindle 4 of the machine tool. When the spindle 4 is rotated, the tool, arranged in the spindle 4, rotates around its longitudinal axis C. The cutting part 3 may comprise an elongated insert holder 5 and an insert 10 fastened thereto. The insert 10 is an interchangeable part made from a highly durable material and comprising at least one cutting edge. Alternatively, the cutting edge may be provided directly in the insert holder 5 or the like. The insert holder 5 is arranged transversely to the body 1 and its fastening is arranged such that, when required, the insert holder 5 can move in the radial direction A of the tool. The insert holder 5 may be arranged to be controlled and supported by guide surfaces or the like. FIG. 1 shows the cutting part 3 in a first, i.e. inner position, and FIG. 2 shows the cutting part in a second, i.e. outer position. Accordingly, the cutting part 3 has two positions, between which the cutting part 3 can be shifted when it is arranged in the spindle 4 of the machine tool. The mutual position of the cutting part 3 and the body 1 can be affected by means of the rotating movement of the spindle 4, and a spring element 6 and an actuator 7. When the spindle 4 is rotated, the cutting part 3 is subjected to a centrifugal force tending to move the cutting part 3 in the radial direction A of the tool away from the body 1. In FIG. 1, the cutting part 3 is drawn by means of one or more draw-springs 6 into the inner position and locked immobile by means of the actuator 7 in such a manner that the cutting part 3 retains its inner position in spite of the machining forces and the rotation of the tool. When the locking is released for the duration of indexing, the cutting part 3 moves into the outer position shown in FIG. 2, by the action of centrifugal force. The cutting part 3 can be locked to this outer position by means of the actuator 7. The cutting part 3 can be moved back to the inner position by releasing the locking achieved by the actuator 7 and by stopping the spindle 4, whereby the cutting part 3 is not subjected to centrifugal force, and the spring element 6 is able to pull the cutting part 3 to the inner position. The cutting part 3 is then locked by means of the actuator 7, and machining can be started. The tool may comprise fixed or adjustable contact surfaces, against which the cutting part 3 settles tightly in the first and second positions, respectively. The tool according to FIGS. 1 and 2 can be arranged for two different diameters to be machined, whereby fewer tools than previously can be loaded into the tool magazine of the machine tool. In addition, indexing the cutting part 3 for different diameters is very fast compared with a situation where a conventional tool is replaced for each diameter. When the portion of tool replacement times relative to machining is small, good performance is achieved.

In the solution shown in FIGS. 1 and 2, cutting part indexing is arranged to be accomplished by rotating the spindle 4. Accordingly, cutting part 3 indexing can be accomplished by using normal machining movements of the machine tool, and no special devices are required. Furthermore, commands regarding movements required in indexing can be easily added to the programs of numerically controlled machine tools. Consequently, the tool according to the invention is suitable for use in conventional machine tools without any changes.

The actuator 7 may be a pressure medium operated cylinder, whose piston or cylinder is arranged to press against the shaft of the insert holder 5 and cause the friction required in the locking between the cutting part 3 and the actuator 7. Alternatively, a pressure medium operated motor or another pressure medium operated device can be used for generating the required fastening force. The actuator 7 can be operated by means of the pressure medium used in flushing the tool, the tool and the spindle 4 already comprising conduits 8 required for leading pressure medium to the actuator 7. Flushing refers to cooling and lubricating the cutting part 3, and to chip removal. The medium typically used for flushing is cutting fluid, but it can also be another fluid or gas, e.g. water or pressurized air. In other words, the actuator 7 can be controlled by controlling the normal flushing of the machine tool. The necessary control commands can be easily added to programs run in control units 22 of numerically controlled machine tools. In the tool, the flushing conduit 8 can be branched such that a special conduit 40 leads to cutting part flushing and another conduit to the actuator 7. During machining, cutting fluid is fed, whereby the cutting part 3 obtains the required flushing and, at the same time, the actuator 7 locks the cutting part 3 in its position. During indexing, however, cutting fluid is not fed at all.

In some cases, the tool can be constructed such that the cutting part 3 can be indexed into more than two different positions. In this case, the tool may comprise means for preventing the movement of the cutting part 3 in one direction, but allowing the stepwise movement of the cutting part 3 in another direction. Such a tool comprising several indexable positions can replace several conventional tools having a fixed setting.

Figure 3:
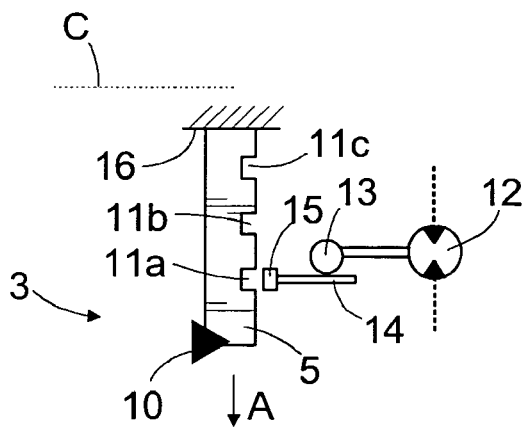

FIG. 3 shows, highly simplified, an arrangement based on mechanical shape locking for locking a cutting part 3 into indexed positions. For the locking, the shaft of an insert holder 5 is provided with slots 11a to 11c. An actuator 7 may comprise a hydraulic motor 12 arranged to drive a rack bar 14 by means of a pinion gear 13, and further a locking piece 15 at the end of the rack bar 14. In the situation shown in FIG. 3, the cutting part 3 is in the innermost position, where it is supported against a supporting surface 16. When the locking piece 15 is released from slot 11a, and the tool is rotated around its axis C by means of a spindle 4, the cutting part 3 is subjected to centrifugal force, which moves the cutting part 3 further at the next slot 11b, after which the cutting part 3 can again be locked by pushing the locking piece 15 into slot 11b. The cutting part 3 shown in FIG. 3 can be indexed into a third position, allowing the cutting part 3 to be locked by means of slot 11c.

Figure 4:
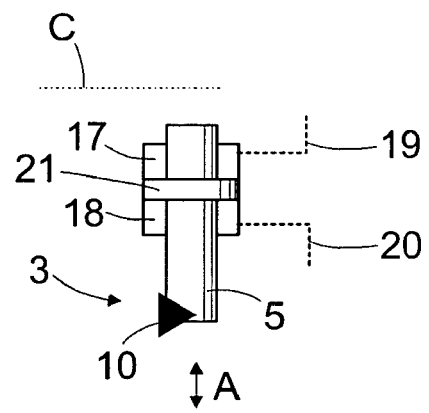

FIG. 4 shows another alternative locking mechanism for locking a cutting part 3 into indexed positions. For the locking, two pressure spaces 17 and 18, into which pressure medium pressure can be led from conduits 19 and 20, are provided around the shaft of an insert holder 5. In addition, the shaft of the insert holder 5 is provided with a shoulder 21 for separating the pressure spaces 17 and 18. The pressure surfaces of the shoulder 21 on the side of the pressure spaces 17 and 18 are substantially equally large. When a substantially equal pressure fluid pressure is led to the pressure spaces 17 and 18, the forces acting on the shoulder 21 are equal, allowing the cutting part 3 to be locked hydraulically in the desired positions.

The construction shown in FIG. 4 can also be applied by moving the cutting part 3 by means of pressure medium, not by means of the rotating movement of a spindle 4. In this case, leading pressure from a conduit 19 to the first pressure space 17 and releasing pressure via a pressure conduit 20 from the second pressure space 18 allows the cutting part 3 to be indexed into a first position. When the cutting part 3 is in the first position, the shoulder 21 is at least partly against the end of the second pressure space 18. When the cutting part 3 is indexed into a second position, pressure medium pressure is led from the conduit 20 to the second pressure space 18, and, correspondingly, pressure liquid is released along the conduit 19 from the first pressure space 17, whereby the shoulder 21 moves towards the end of the first pressure space 17. In this solution, both indexing and locking take place by means of a pressure medium operated actuator 7. The actuator 7 can be operated by controlling the feed of cutting fluid. Instead of the construction shown in FIG. 4, two or more separate hydraulic cylinders can be used for indexing and/or locking the cutting part 3.

Figure 5:
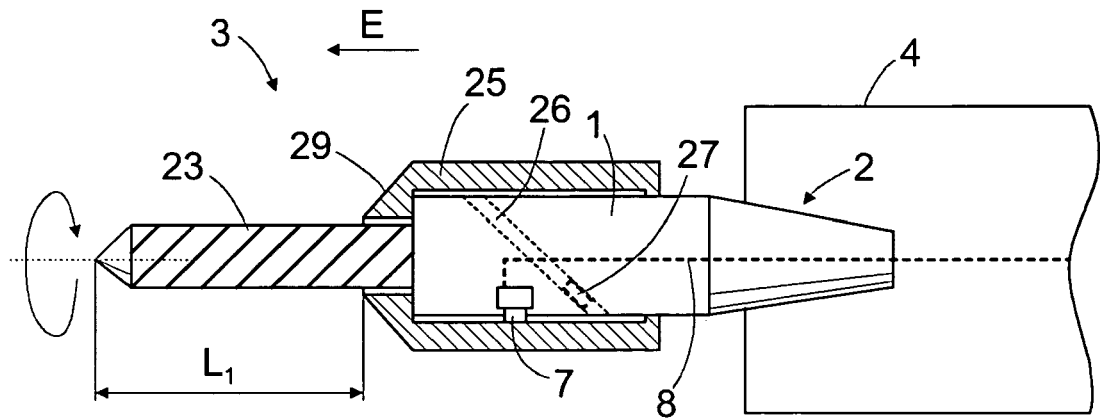
FIG. 5 is a schematic side view of a drilling tool according to the invention with the cutting part in a first position.
Figure 6:
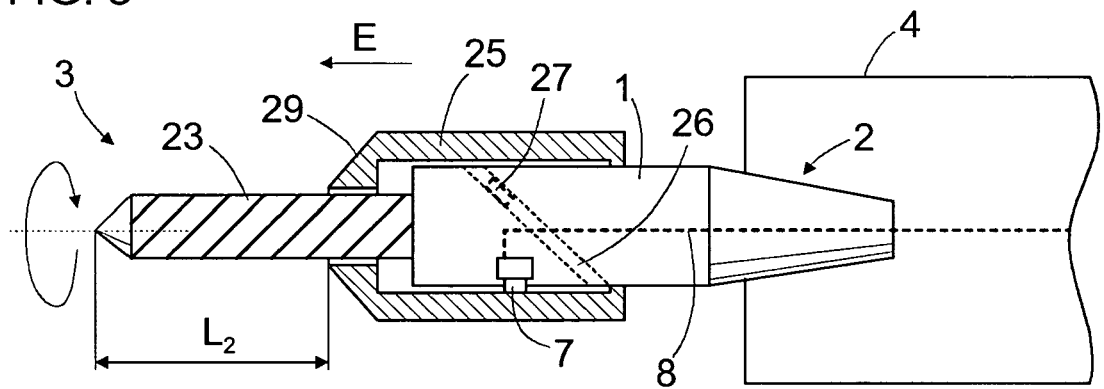
FIG. 6 is a schematic side view of the tool of FIG. 5 with the cutting part in a second position.

FIG. 5 shows a drilling tool for making holes provided with a countersinking. The tool comprises a body 1. It may also comprise a fastening part 2, from which it can be directly or by means of suitable means fastened to a spindle 4 of a machine tool. The front part of the body 1 comprises a fixed cutting part 23 having an elongated spiral drill or the like. Furthermore, a substantially sleeve-like indexable countersinking cutting part 25 is arranged around the body 1 of the tool. When desired, the indexable cutting part 25 can be indexed into the rearmost position shown in FIG. 5, and into the foremost position shown in FIG. 6. Indexing allows the same tool to be used for slanting drilling holes having different depths. The cutting part 25 comprises one or more cutting edges 29. The inner surface of the indexable countersinking cutting part 25 may be provided with one or more slanting guide grooves 26 and the outer surface of the body 1 with counterparts 27 that fit in said guide grooves 26. When the spindle 4 starts to be rotated with a sudden movement or when the spindle 4 is abruptly stopped, a movement difference is generated between the body 1 and the indexable cutting part 25 because of the different moments of inertia of the pieces. Said movement difference and the slanting guide groove 26 cause the indexable cutting part 25 to move in the axial direction E of the tool, guided by the guide groove 26. FIG. 6 shows the foremost position of the indexable cutting part 25. Rotation of the spindle 4 with an abrupt movement in the opposite direction results, by the action of moments of inertia, in the generation of a movement difference that makes the cutting part 25 move back into the innermost position shown in FIG. 5. Instead of the guide grooves 26, other structures can naturally also be used, enabling the movement of the indexable cutting part 25, by the action of forces of inertia, in the axial direction of the tool. In accordance with the invention, axial movement of the indexable cutting part 25 is prevented by using a pressure medium operated actuator 7 arranged in the tool. The locking principle of the actuator 7 can be accordant with some of the above-described principles.

Figure 7:
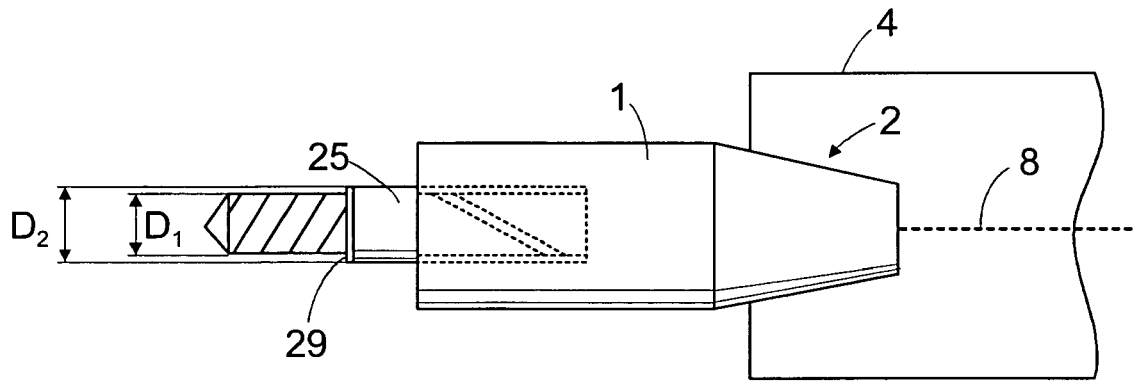
FIG. 7 is a schematic side view of another drilling tool according to the invention.

FIG. 7 shows a drilling tool comprising a body 1, a fastening part 2, a fixed cutting part 23, and an indexable cutting part 25. In this case, the cutting part 25 is tubular and arranged around the fixed cutting part 23. If the intention is to drill holes having a larger diameter $D_2$, the cutting part 25 is indexed into its front position, whereby the hole to be machined gets a diameter corresponding to the ring cutting part 25. The tool may comprise a mechanism corresponding to the solution of FIG. 5 for converting the movement difference, resulting from the moments of inertia, into an axial movement of the tool. Some of the above-described principles can be applied to locking the cutting part 25.

Figure 8:
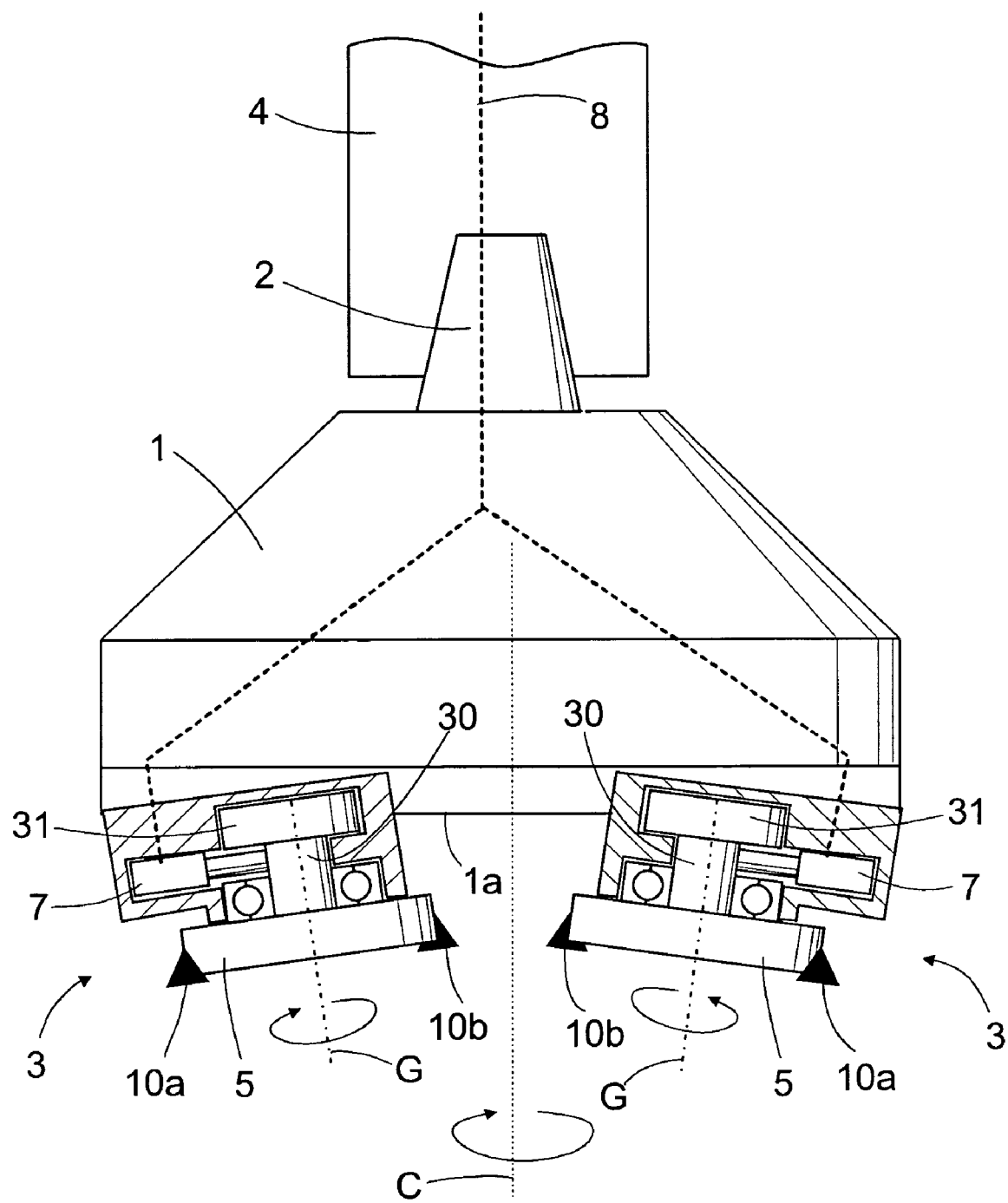
FIG. 8 is a schematic sectional view of a milling tool according to the invention, and FIG. 9 schematically shows the principle of a tool according to the invention.

FIG. 8 shows a tool used in milling. Two or more cutting parts 3 are arranged in a front surface 1a of a body 1 of the tool on a predetermined circle relative to the longitudinal axis C of the tool. Each cutting part 3 comprises an insert holder 5 arranged by means of an axle 30 such that it is able to rotate around an axis G. One end of the axle 30 is provided with a power transmission element 31 for affecting the turning of the axle 30. The power transmission element 31 may comprise a latch mechanism, a ratchet mechanism or the like, whereby the axle 30 is arranged to turn in one direction only. In addition, the power transmission element 31 positions the cutting part 3 in exactly the correct position. Furthermore, in connection with each cutting part 3 is an actuator 7 for locking the cutting part 3 immobile relative to the body 1. The insert holder 5 comprises at least two inserts 10a and 10b or corresponding cutting edges, which can be turned in different positions by indexing the cutting part 3. In FIG. 8, the outermost inserts 10a are indexed for machining. When the first inserts 10a are worn, the second inserts 10b can be indexed in place thereof. The moment of inertia can again be utilized in the indexing, i.e. by rotating the spindle 4 abruptly, a movement difference is generated between the body 1 and the cutting parts 3, and it can be utilized to make the cutting parts 3 turn around the axles 30 from one position into another. Alternatively, the cutting parts 3 can be indexed by means of a pressure medium operated indexing device. In this case, the tool may comprise a hydraulic motor arranged to turn the axle 30.

Figure 9:
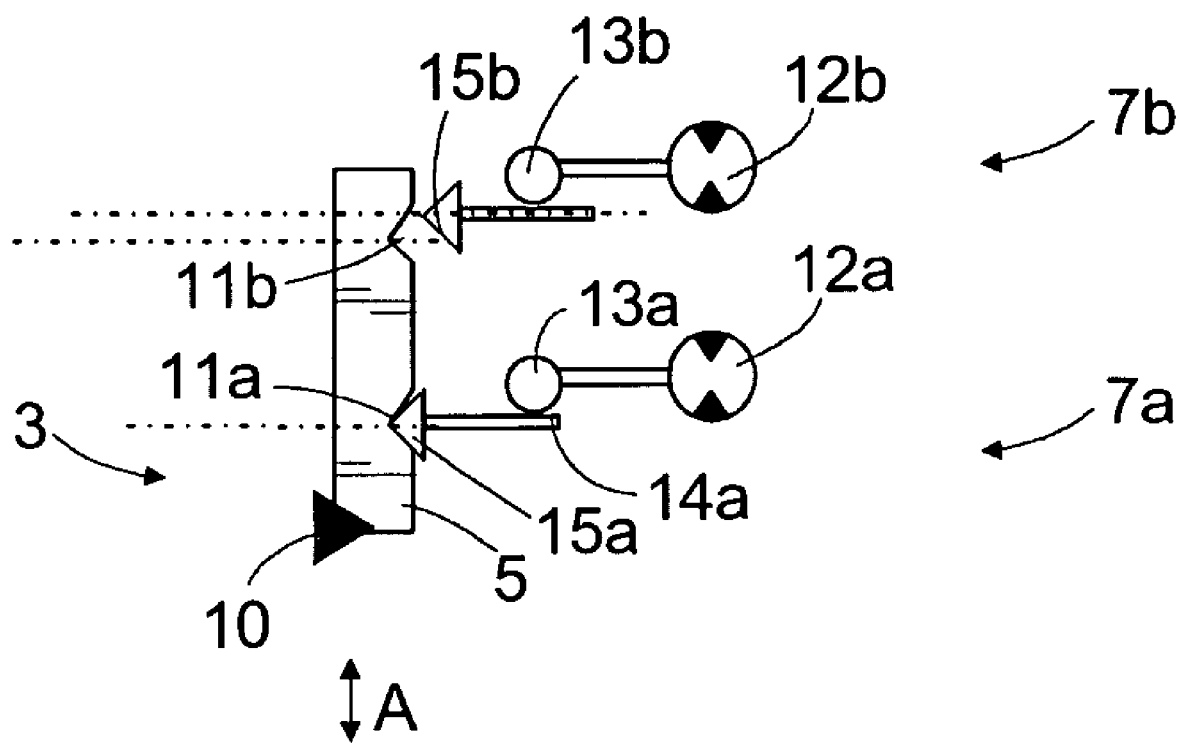

FIG. 9 is a simplified figure of another arrangement based on mechanical shape locking for indexing a cutting part 3 and locking it into the desired positions. For locking and indexing, the shaft of an insert holder 5 is provided with two or more slots 11a and 11b. The slots 11a and 11b are formed wedged, i.e. pushing a wedged locking piece 15a, 15b into the wedged slot 11a, 11b by means of an actuator 7a, 7b results in that the locking piece 15a, 15b causes the insert holder 5 to move in direction A. The locking piece 15a, 15b thus indexes first the cutting part and then locks it in place. For the indexing, the distance between the slots 11a and 11b in direction A is arranged to deviate from the distance between the locking pieces 15a and 15b in direction A. In the situation shown in FIG. 9, the cutting part 3 is in a first position, the locking piece 15a provided with a wedged end being pushed into slot 11a, whereby it has forced the cutting part 3 in direction A into the position shown in the figure. Indexing into a second position takes place by the first locking piece 15a being pulled from the first slot 11a, after which the second actuator 7b starts to push the second locking piece 15b into the second slot 11b. Since the centre axle of the second slot 11b and the centre axle of the second locking piece 15b are at a distance from each other in direction A, pushing the wedged second locking piece 15b into the second slot 11b causes the insert holder 5 to be indexed. The wedged form thus causes what is called self-centring, and at the same time shape locking, too. There may be several indexable positions, and there may be a special slot, locking piece and actuator for each indexable position. The actuator 7a, 7b may comprise a hydraulic motor 12a, 12b arranged by means of a pinion gear 13a, 13b to drive a rack bar 14a, 14b, and further the locking piece 15a, 15b at the end of the rack bar 14.

Let it be stated that other mechanisms and components known per se in the art can also be used to achieve the force required in the indexing. Consequently, the elements used for the indexing may comprise e.g. pinion gears, rack bars, eccentric discs, etc.

The drawings and the related description are only intended to illustrate the inventive idea. The details of the invention may vary within the scope of the claims.

What is claimed is:

1. A method of indexing a rotating tool used in machining, comprising:
    rotating the tool around its axis in a spindle of a machine tool;
    indexing at least one cutting part comprised by the tool relative to a body of the tool in such a manner that the cutting part has at least a first discrete locked position for cutting and a second discrete locked position for cutting;
    locking, into the first discrete locked position or the second discrete locked position, the indexed cutting part immobile relative to the body of the tool by means of a pressure medium operated actuator comprised by the tool; and
    applying, during the locking, the pressure medium pressure used in flushing the cutting part to the actuator.

2. A method as claimed in claim 1, comprising:
    indexing the cutting part by using the movements of the spindle of the machine tool.

3. A method as claimed in claim 1, comprising:
    indexing the cutting part by using the pressure medium operated actuator comprised by the tool.

4. A method as claimed in claim 1, comprising:
    indexing the cutting part by using the movements of the spindle of the machine tool; and
    utilizing the moments of inertia of the cutting part and the body in the indexing.

5. A method as claimed in claim 1, comprising:
    indexing the cutting part by using the movements of the spindle of the machine tool; and
    utilizing the centrifugal force directed to the cutting part during rotation of the tool in the indexing.

6. A method as claimed in claim 1, comprising
    locking the movement of the cutting part in the radial direction relative to the body of the tool by means of the actuator.

7. A method as claimed in claim 1, comprising
    locking the movement of the cutting part in the direction of the longitudinal axis of the tool by means of an actuator.

8. A method as claimed in claim 1, comprising
    locking the rotation of the cutting part relative to its axle by means of the actuator.

9. A tool for machining, the tool comprising:
    a body;
    at least one cutting part;
    means for indexing the cutting part relative to the body into at least a first discrete locked position and a second discrete locked position;
    at least one pressure medium operated actuator for locking the cutting part into said indexed positions for cutting a workpiece; and
    at least one conduit for leading pressure medium to said actuator and applying, during the locking, the pressure medium pressure used in flushing the cutting part to the actuator.

10. A tool as claimed in claim 9, wherein the body of the tool comprises:
    a fastening part adaptable to a spindle of a machine tool; and
    at least one conduit extending from the fastening part to the actuator, and along which conduit medium used in flushing the tool is arranged to be led from the spindle of the machine tool to the actuator.

11. A tool as claimed in claim 9, wherein
    the actuator is hydraulically operated and arranged to be used by means of cutting fluid of the machine tool.

12. A tool as claimed in claim 9, wherein the cutting part comprises:
    an insert holder; and
    at least one cutting edge arranged in the insert holder, the actuator being arranged to press against the insert holder and lock the cutting part immobile relative to the body by means of friction.

13. A tool as claimed in claim 9, wherein the cutting part comprises an insert holder, at least one cutting edge being arranged in the insert holder, the actuator being arranged to be locked in the insert holder by shape locking and to prevent a mutual movement of the cutting part and the body.

14. A tool as claimed in claim 9, wherein the cutting part comprises:
    an insert holder;
    at least one cutting edge arranged in the insert holder; and
    a first pressure space and a second pressure space arranged around the insert holder, the insert holder comprising a shoulder for separating said pressure spaces, the pressure spaces being connected to conduits for leading pressure medium into the pressure spaces, and the movement of the insert holder being arranged to be prevented by directing an equally strong force effect to the shoulder from the side of the first pressure space and the second pressure space.

15. A tool as claimed in claim 9, wherein
    the tool comprises means for indexing the cutting part by means of pressure medium.

16. A tool as claimed in claim 9, wherein
    the tool comprises means for indexing the cutting part by means of pressure medium,
    the indexing means comprise at least a pressure medium operated first actuator and a pressure medium operated second actuator,
    the first actuator is arranged to move a first locking piece, and the second actuator is arranged to move a second locking piece,
    the locking pieces are provided with wedged portions,
    the locking pieces are placed at a first distance from each other,
    the cutting part comprises an insert holder, in which at least one cutting edge is arranged,
    the insert holder has at least a first slot and a second slot at a second distance from each other,
    the slots are formed wedge-like,
    said first distance and second distance are unequal, and
    pushing the locking piece into the slot is arranged to accomplish the indexing and shape locking of the insert holder.

17. A method of indexing a rotating tool used in machining, comprising:
    rotating the tool around its axis in a spindle of a machine tool;
    indexing at least one cutting part comprised by the tool relative to a body of the tool in such a manner that the cutting part has at least a predetermined first discrete locked cutting position and a predetermined second discrete locked cutting position;
    locking, into the first discrete locked cutting position or the second discrete locked cutting position, the indexed cutting part immobile relative to the body of the tool by means of a pressure medium operated actuator comprised by the tool, the tool comprising at least one conduit for leading pressure medium to the actuator; and applying, during the locking, the pressure medium pressure used in flushing the cutting part to the actuator.

18. A tool for machining, the tool comprising:

a body;

at least one cutting part;

means for indexing the cutting part relative to the body into at least a predetermined first discrete locked cutting position and a predetermined second discrete locked cutting position;

at least one pressure medium operated actuator for locking the cutting part into said indexed positions for cutting a workpiece; and at least one conduit for leading pressure medium to said actuator and applying, during the locking, the pressure medium pressure used in flushing the cutting part to the actuator.

* * * * *